May 22, 1951  O. E. DEMPSEY  2,553,899
WINDSHIELD FOR WELDING
Filed May 9, 1947 2 Sheets-Sheet 1
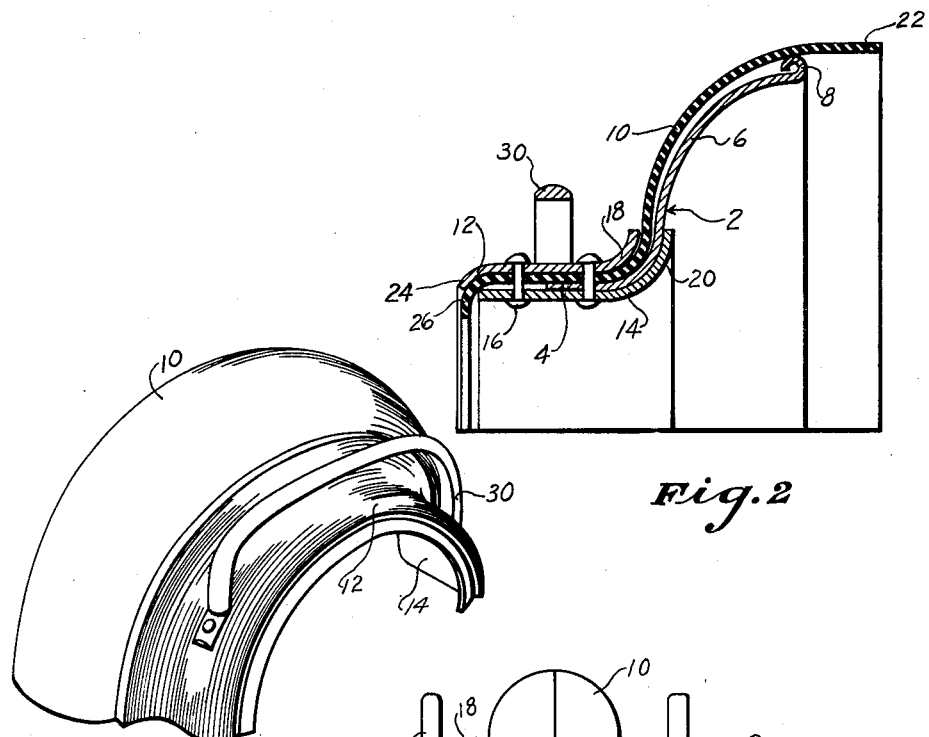
Fig. 2
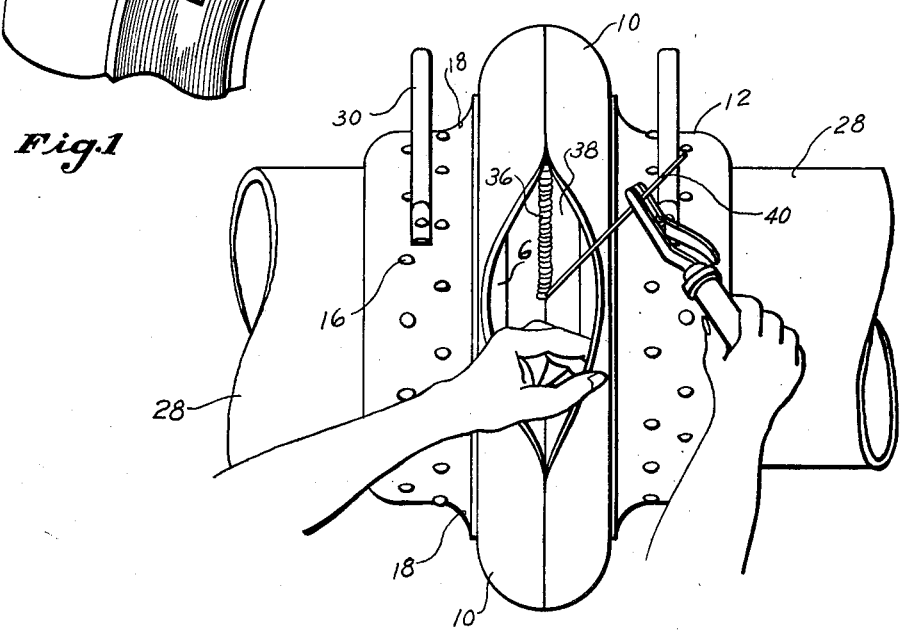
Fig. 1
Fig. 3
INVENTOR
O. E. Dempsey
BY
C. M. McKnight May 22, 1951  O. E. DEMPSEY  2,553,899
WINDSHIELD FOR WELDING Filed May 9, 1947  2 Sheets-Sheet 2

INVENTOR
O. E. Dempsey
BY
C. M. McKnight

Patented May 22, 1951

2,553,899

UNITED STATES PATENT OFFICE 2,553,899

WINDSHIELD FOR WELDING

Oscar E. Dempsey, Tulsa, Okla., assignor to Dempsey Pump Co., Tulsa, Okla., a corporation of Oklahoma Application May 9, 1947, Serial No. 747,149

2 Claims. (Cl. 113—111)

1

This invention relates to a windshield, and more particularly but not by way of limitation, to a shield or windbreak for protecting the welding operation of longitudinal cylindrical bodies, such as a pipe line or the like.

In the construction of cross country pipe lines the various sections of pipe have to be welded at frequent intervals, and it will be apparent that pipe line construction is done in open country and consequently subject to all kinds of weather conditions, particularly high velocity winds, rain, sleet, snow, and the like. The circumferential welding operation for the two end sections of pipe is particularly subject to the velocity of the wind, which, in many instances, will cause a distortion of the molten metal during the welding operation whereby an efficient and proper weld is difficult and sometimes impossible to obtain. Furthermore, the winds and weather conditions will cool the molten metal much quicker than is desired in a welding operation of this type.

The present invention relates generally to a windshield adapted to be freely disposed on a cylindrical body such as on a pipe line or the like, and comprises a plurality of connecting segmental members arranged in face to face relationship having flexible members capable of easy access by a welder or the like, so that the end sections of the pipe may be properly and efficiently welded without any possibility of distortion from wind currents.

It is an important object of this invention to provide means to prevent wind currents from coming in contact with the molten metal during a welding operation on cylindrical bodies or the like.

And still another object of this invention is to provide a portable windshield adapted to be easily connected to the outer periphery of a pipe line or the like in order to protect the welding operation for the end pipe sections from distortion by wind currents and other elements of weather.

Another object of this invention is to provide a windshield for protecting the welding operation of pipe lines from wind currents which permits the ready accessibility of the welder to the end sections of the pipe to be welded, and at the same time protecting the molten metal of the weld from the elements of the weather.

And still an additional object of this invention is to provide a pair of flexible members arranged in face to face relationship, adapted to be circumferentially disposed about a pipe line or the like, yet permitting access to the periphery of the pipe in order to provide a welding oper-

2 ation between two end sections thereof, which is substantially shielded from wind currents or the like during the welding operation.

Other objects and advantages of the invention will be evident from the following detailed description read in conjunction with the accompanying drawings which illustrate my invention.

In the drawings:

Figure 1 is a perspective view of one of the segments of the shield.

Figure 2 is a sectional elevational view of the segment.

Figure 3 is a side elevational view showing the operation of the device in assembly.

Figure 4:
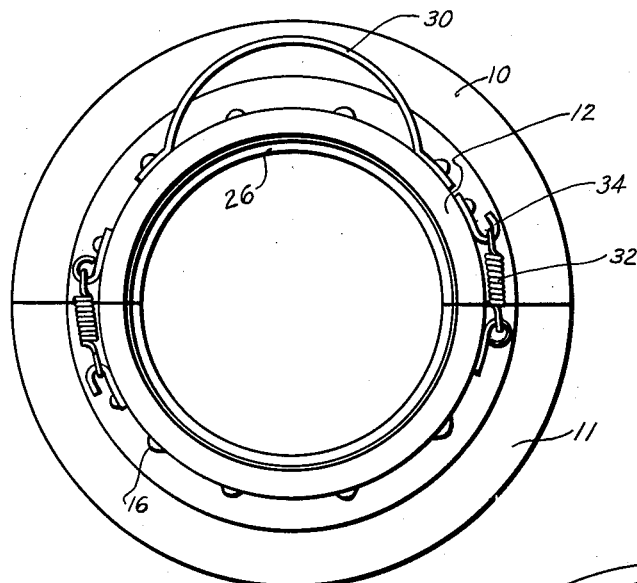
Figure 4 is a front elevational view of the assembled device shown in Figure 3.

Referring to the drawings in detail and more particularly Figures 1, 2, and 3, reference character 2 indicates a metal, or the like, shield having a substantially flat horizontally disposed body portion 4 adapted to be bent or formed to provide an arcuate or curved extension 6, as clearly shown in Figure 2. The end portion of the curved extension 6 is bent back to form a loop member 8 for a purpose as will be hereinafter set forth. The shield 2 is of a substantially semi-circular shape in elevation, as is clearly shown in Figures 1 and 4 for a purpose as will be hereinafter set forth. The shield is preferably made of any lightweight metal, plastic, or the like, but it is to be understood that it is not limited thereto. The shield 2 is covered with a backing member 10 of rubber or other pliable material such as a pliable plastic or the like, but not limited thereto. From Figure 2 it will be seen that the pliable cover 10, preferably of molded rubber, is disposed on the outer face of the shield 2 and held thereto by a top plate 12, and lower plate 14 secured to the flat portion 4 of the plate 2 by the usual rivets 16. The plates 12 and 14 are of substantially semi-circular configuration in conformity with the elevational contour of the shield 2. Furthermore both plates 12 and 14 are curved at 18 and 20 to assist in conforming the rubber cover plate 10 to the arcuate portion 6 of the shield 2. One end section 22 of the rubber shield 10 extends slightly over the loop portion 8 of the curved shield 6 for a purpose as will be hereinafter set forth. The plate 12 is provided with a downwardly extending portion 24 cooperating with the end 26 of the rubber cover 10 in order to provide a substantially vertical disposition of the end 26 when in contact with the outer periphery of the pipe 28. A handle member 30 is secured by rivets or the like to the top plate 12, as clearly shown in Figure 1.

From an inspection of Figures 3 and 4 it will be apparent that two substantially semi-circular shields or duplicate windbreakers may be arranged on the pipe 28 in face to face relationship, as clearly shown in Figure 3. The top or upper semi-circular windbreakers are preferably connected with exact duplicate windbreakers 11 disposed beneath the pipe 28 as shown in Figure 4, and connected together by spring latch members 32 cooperating with hooks or lugs 34, in order to provide a completely circumferentially arranged segmental shield cooperating with an exact duplicate segmental shield disposed in face to face relationship thereof. This arrangement, as shown in Figure 3, is disposed on a cylindrical body, such as a pipe line 28, near the end sections of the pipe desired to be welded. In open country where high wind velocity and the like would distort the flow, or cause crystallization of metal by oxidation with the wind, the present apparatus substantially precludes any possibility of the wind, or other elements of weather, contacting the weld during the welding operation.

The vertical disposition of the circumferential lip 26 is such to bear against the pipe and act as a seal preventing wind from entering underneath the shields 2 when in the position shown in Figure 3. Furthermore the flexibility of the rubber material, and particularly the outer end 22, permits the welder or operator to draw back or open up these ends of the covers 10 and 11 from the edge to edge arrangement, as shown in Figure 3, so that the operator will have ingress for applying the weld 36 along the edge sections of the pipe 28. The opening 38 of the lips 22 can be varied, dependent upon the length of the overlapping ends 22 of the covers 10 and 11. It will be apparent that the welder may continuously progress around the pipe by opening the lips 22 along this circumferential path of the welding operation. Furthermore it will be apparent that the lips 22 of the rubber shield 10 will remain in a substantially closed face to face position at circumferential points about the pipe other than the particular opening 38 during the welding operation. The operator may hold the lips 22 back with his hands, or by any suitable tool not shown. The welding rod 40, as clearly shown in Figure 3, affords a convenient means of maintaining a lip 22 in open position. Furthermore, the curved portion 6 of the shield 10 acts as a support or arm rest for the welder during the welding operation.

From Figures 3 and 4 it will be apparent that the connected segmental halves of the duplicate shields may be moved longitudinally along the pipe in order to be brought into desired position for welding. Furthermore, the spring members 32 supply sufficient compression between the segmental halves to maintain the half sections in a substantially firm position relative to the pipe 28.

Figure 5:
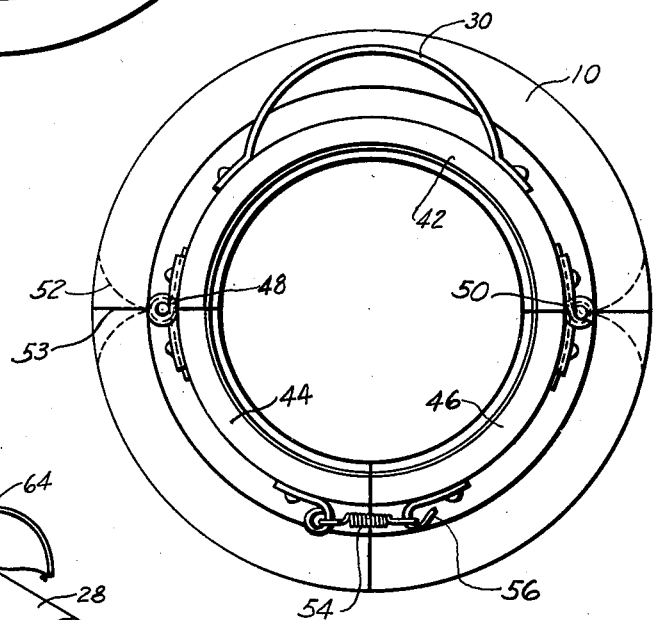
Figure 5 is a view similar to Figure 4, showing a modification in the arrangement of the shield segments.

Figure 5 shows a slight modification wherein the pair of upper semi-circular halves cooperate with a pair of duplicate quarter-circular segments. It will be understood that it is preferable to have the duplicate segments arranged in a face to face relationship, as shown in Figure 3, in order to provide the complete shield member, however only one-half of the shield may be utilized, particularly dependent upon the direction of the wind. The upper shield 10 cooperates with the lower quarter-segments 44 and 46 in exactly the same manner as in the preferred embodiment. However in lieu of spring latch members 32 the semi-circular upper segments 42 are connected to each of the quarter-shield segments 44 and 46 by torsional spring hinges 48 and 50 respectively. It will be noted that the outer metal rim 6 is cut away in both the upper and lower shields as shown in dotted lines at 52 to permit the hinge operation. However the rubber shield extends into edge to edge contact as shown at 53. The lower segmental members 44 and 46 may be held together by the spring latch 54 secured to hook members 56 provided thereon. The arrangement shown in Figure 5 permits easy separation and removability of the circular shield onto a pipe line, particularly in the larger size pipes, in that the spring 54 may be unlatched and the lower segments 44 and 46 swung upward on their respective hinges for placement onto the pipe 28, or removal therefrom.

Figure 6:
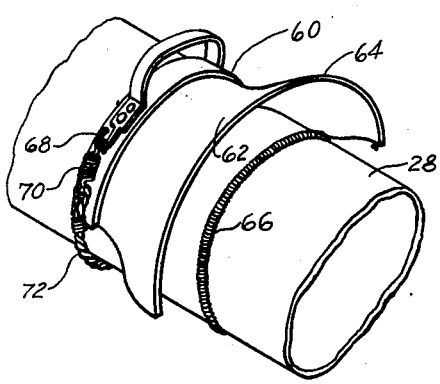
Figure 6 is a perspective view showing a modification of the device.

In Figure 6 is shown a modification of one of the semi-circular shield segments. A duplicate shield is not shown for purposes of clarification. In this modification the shield comprises a rim portion 60, preferably made of metal but not limited thereto, to which is molded an arcuately shaped rubber body 62. Although not shown, the portion of the rubber secured to the rim 60 is slightly thicker than the outer edge portion 64 thereof, in order to provide better flexibility to the edge portion 64 and facilitate the opening 38 thereof in complete assembly similar to that shown in Figure 3. This modified construction eliminates the backing curved plate 6, and can be utilized when only portions of the pipe end sections are desired to be welded, as shown at 66. The metal ring 60 comprises a hook member 68 cooperating with a spring 70 which, in turn, is secured to a chain or cable 72 extending around the pipe 28 to be connected at the opposite side of the plate 60 in a similar manner not shown. It will be apparent that the shield 62 as shown in Figure 6 is disposed on the pipe for cooperation with a duplicate shield not shown, and in face to face relationship in the same manner as in the preferred embodiment. However the disposition of the semi-circular halves on the pipe 28 is such to permit movement of the shields around the pipe during the welding operation in order to complete the circumferential weld 66. This structure is utilized when high velocity winds are not present and the weather is more or less normal.

From the foregoing it will be apparent that the present invention provides a windshield adapted to be disposed on pipe lines for protecting the welding operation against wind currents. A single shield may be provided when the wind is in one direction only, or a double shield arranged in face to face relationship may be provided in case of high velocity winds or cross winds. The face to face relationship of the duplicate shield permits an opening due to the flexibility of the rubber backing plate so that the operator may have an ingress to the end sections of the pipe to be welded. Furthermore, the flexibility of the rubber permits the windshield to close in the front and the back of the opening where the weld is being made, and the curvature of the rubber shield and backing plate allows air currents to pass over the top side of the shield in a streamlined effect, leaving the air inside of the rubber shield free from eddies or cross currents. The air pocket inside the shield permits the molten metal of the welding operation to cool without any undue crystallization thereof from oxidation. The windbreak may be rolled completely around the pipe as the welder progresses, particularly in the case of the modification shown in Figure 6. However, the welder may move progressively around the pipe for completing a weld, as shown in the preferred embodiment. Furthermore, the segmental windbreaks are adapted for movement longitudinally along the pipe from one welding joint to another.

Changes may be made in the combination and arrangements of parts as heretofore set forth in the specification and shown in the drawings, it being understood that any modification in the precise embodiment of the invention may be made within the scope of the following claims without departing from the spirit of the invention.

What I claim is:

1. A welding windshield for pipe lines comprising a plurality of segmental duplicate arcuate sections adapted to surround the pipe in face to face relationship, each of said sections comprising a plurality of segments, each having a flat portion in substantial alignment with the longitudinal axis of the pipe, arcuate means connecting with and extending outwardly from the flat portion, pliable rubber means secured to the flat portion and disposed above the arcuate means in overhanging relation to the outer edge thereof and surrounding the pipe, said pliable means abutting a duplicate rubber means on a duplicate arcuate section to provide a continuous shield around the pipe, said flexible means permitting ingress to the pipe at any circumferential point covered by the shield, and resilient means for connecting the plurality of segments of each section around the pipe.

2. A windshield for welding operations on pipe lines and the like, comprising a pair of arcuate segmental sections adapted to surround the pipe in face to face contacting relationship, each of said sections comprising a substantially cylindrical segmental body portion having complimentary curved extensions extending outwardly from each cylindrical segment, segmental resilient means secured to the body portion of each section and extending over the curved extensions thereof, a lip portion on each resilient means overhanging the respective curved extension, said lip portions permitting ingress at any point on the circumference of the pipe immediately beneath the face to face contacting relationship of the lip portions, and means for retaining the segmental sections in assembly on the pipe.

OSCAR E. DEMPSEY.

REFERENCES CITED

The following references are of record in the file of this patent:

UNITED STATES PATENTS

| Number | Name | Date |
|---|---|---|
| 1,354,266 | Plant | Sept. 28, 1920 |
| 1,886,643 | Chapman | Nov. 8, 1932 |
| 1,981,850 | Fisher | Nov. 27, 1934 |
| 2,002,877 | Barrington | May 28, 1935 |
| 2,160,082 | Nicolson | May 30, 1939 |
| 2,184,881 | Martinet | Dec. 26, 1939 |
| 2,378,123 | Beck | June 12, 1945 |
| 2,402,731 | Schreiber | June 27, 1946 |
| 2,410,306 | Romberg | Oct. 29, 1946 |